(12) United States Patent
Yang

(10) Patent No.: US 7,139,167 B2
(45) Date of Patent: Nov. 21, 2006

(54) COMPUTER

(75) Inventor: Chang-hwan Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/912,163

(22) Filed: Aug. 6, 2004

(65) Prior Publication Data
US 2005/0030709 A1  Feb. 10, 2005

(30) Foreign Application Priority Data
Aug. 7, 2003  (KR)  ............... 10-2003-0054713

(51) Int. Cl.
H05K 7/16 (2006.01)
(52) U.S. Cl. ............ 361/686; 312/223.2; 206/576
(58) Field of Classification Search ........ 361/679–687, 361/724–727; 312/223.1–223.6, 348.6; 206/320, 206/576; 16/405
See application file for complete search history.

(56) References Cited

U.S. PATENT DOCUMENTS 5,159,533 A * 10/1992 Kuang .................. 361/686
5,741,055 A * 4/1998 Chen ..................... 312/348.6
6,115,883 A * 9/2000 Um ......................... 16/405
6,219,226 B1 * 4/2001 Bullington et al. ......... 361/683
6,711,011 B1   3/2004 Lee ......................... 361/685
6,798,664 B1 * 9/2004 Lin et al. .................. 361/727
2004/0008480 A1 * 1/2004 Kim ......................... 361/683

FOREIGN PATENT DOCUMENTS

KR  2000-0006948  4/2000
KR  10-2003-0032647  4/2003

OTHER PUBLICATIONS

Copy of Korean Office Action.

* cited by examiner

Primary Examiner—Hung Van Duong
(74) Attorney, Agent, or Firm—Staas & Halsey LLP

(57) ABSTRACT

A computer having a computer main body mounted with a plurality of hardware, the computer also having: a port part provided on a part of the main body and having at least one port; a cover slidably connected to the computer main body to open and close the port part; and a guide gear, provided between the cover and the port part, to guide the cover to slide between an open position, at which the cover opens the port part, and a closed position, at which the cover closes the port part. Thus, the cover slides smoothly to open and close the port part.

23 Claims, 11 Drawing Sheets

COMPUTER

CROSS-REFERENCE TO RELATED APPLICATIONS

This application claims the benefit of Korean Patent Application No. 2003-54713, filed on Aug. 7, 2003, in the Korean Intellectual Property Office, the disclosure of which is incorporated herein by reference.

BACKGROUND OF THE INVENTION

1. Field of the Invention

The present invention relates to a computer, and more particularly, to a computer in which a cover to open and close a port part slides smoothly.

2. Description of the Related Art

Generally, a conventional computer main body comprises: a main body casing forming an external appearance, a side casing detachably connected with the main body casing to open and close an opening on a side of the main body casing, and a front casing connected to a front surface of the main body casing.

The front casing of the conventional computer main body has a recessed port part having a plurality of ports. A front opening of the port part is opened and closed with a cover connected to the front casing by a slider.

The slider comprises: a pair of guides provided on opposite ends of the cover, and guide grooves positioned on the front opening of the port part, to slidably accommodate the pair of guides.

But when the user slides the cover up and down, if the user does not apply force evenly to the left and right guides, the cover may tilt rightward or leftward, and the cover may not slide smoothly. Therefore, the user must move the cover carefully, to apply force evenly to the guides, which may bring the user inconvenience.

SUMMARY OF THE INVENTION

Accordingly, it is an aspect of the present invention to provide a computer in which a cover to open and close a port part slides smoothly.

Additional aspects and/or advantages of the invention will be set forth in part in the description which follows and, in part, will be obvious from the description, or may be learned by practice of the invention.

The foregoing and/or other aspects of the present invention are also achieved by providing a computer including a computer main body mounted with a plurality of hardware, the computer comprising: a port part provided on a part of the main body and having at least one port; a cover slidably connected to the computer main body to open and close the port part; and a guide gear, provided between the cover and the port part, to guide the cover to slide between an open position, at which the cover opens the port part, and a closed position, at which the cover closes the port part.

According to an aspect of the invention, the computer main body comprises: a main body casing forming an external appearance; and a front casing connected to a front of the main body casing, wherein the port part is recessed from a front surface of the front casing, to provide a front opening.

According to an aspect of the invention, the guide gear comprises: a pair of racks provided on a first surface of the cover along a sliding direction; a pair of pinions disposed in the front casing, spaced apart from each other, to engage the pair of racks, respectively; and a pinion shaft to rotatably support the pair of pinions.

According to an aspect of the invention, the cover comprises: an exposed part provided on an outer portion of the cover, having a length longer than a length of the port part; and a covering part provided on an inner portion of the first surface of the cover to cover the port part, positioned between the exposed part and the port part at the closed position, and having a length shorter than the length of the exposed part, wherein the rack is provided in the covering part.

According to an aspect of the invention, the computer further comprises a guide support to support sliding of the cover against the front casing, the guide support having: inserting parts respectively provided on opposite end parts of the covering part, and a pair of guide grooves, respectively positioned on opposite sides of the port part to slidably accommodate the inserting part.

According to an aspect of the invention, the port part has a pair of pinion exposing openings, each communicating with the respective guide grooves, to expose the pinions to the port part.

According to an aspect of the invention, the first surface of the front casing is provided with: a pair of pinion supports positioned corresponding to the pinion exposing openings, to rotatably support the pinions, respectively; and a shaft support positioned between the pair of pinion supports to rotatably support the pinion shaft.

According to an aspect of the invention, the computer further comprises a pair of stoppers disposed on opposite sides with respect to the port part on the first surface of the front casing to engage lockers respectively positioned in upper parts of each inserting part, to prevent the cover from being moved from the closed position to the open position.

According to an aspect of the invention, the stopper comprises: a fixed part fixed on the first surface of the front casing; and a locking holder extended from the fixed part and having a predetermined elasticity, to engage the locker.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
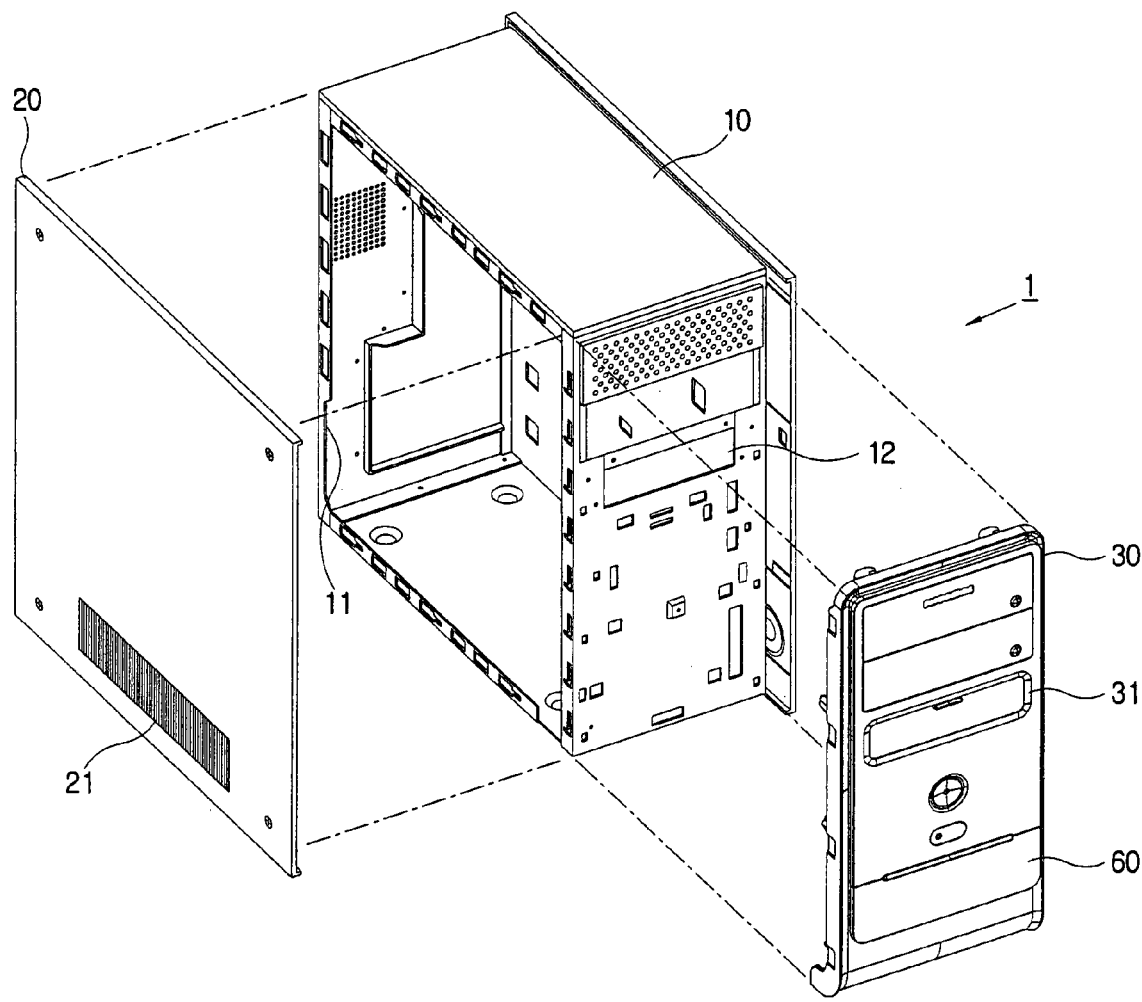
FIG. 1 is an exploded perspective view of a computer according to an embodiment of the present invention.
Figure 2:
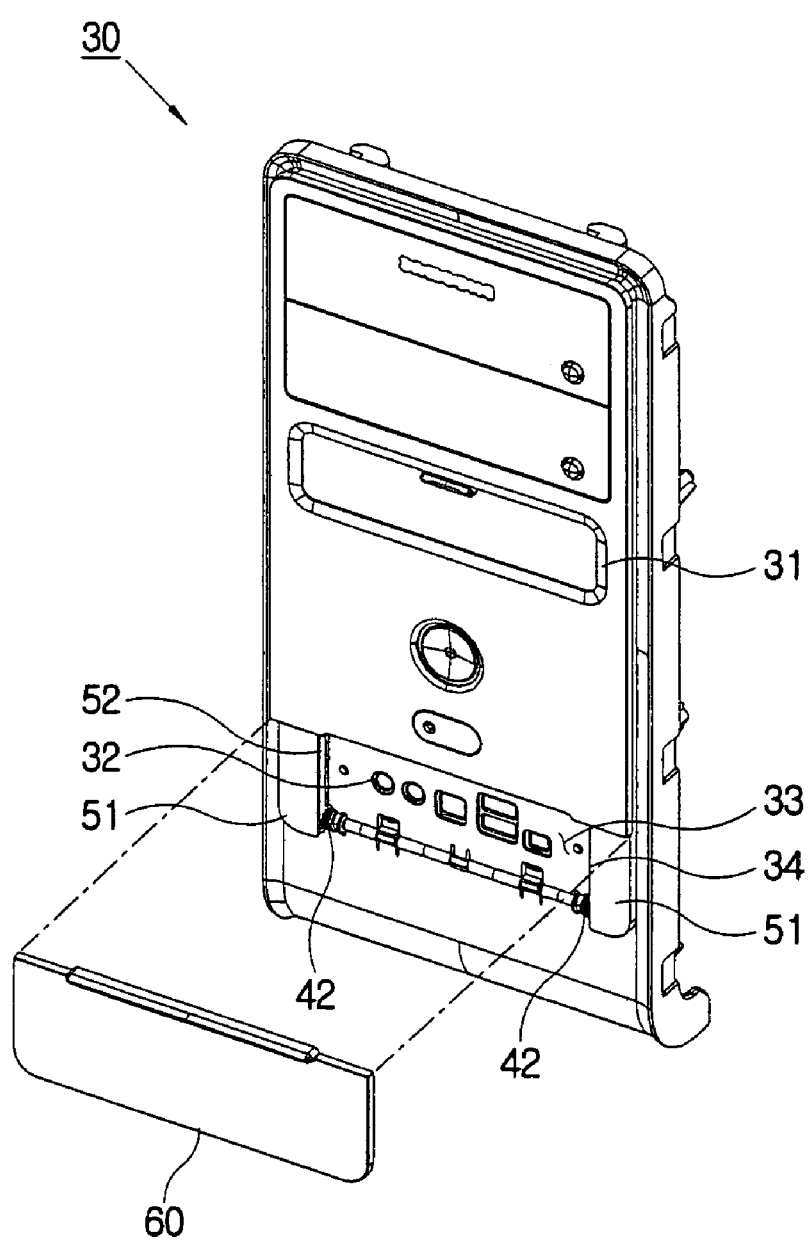
FIG. 2 is a perspective view of a front casing and a cover of the computer of FIG. 1.
Figure 3:
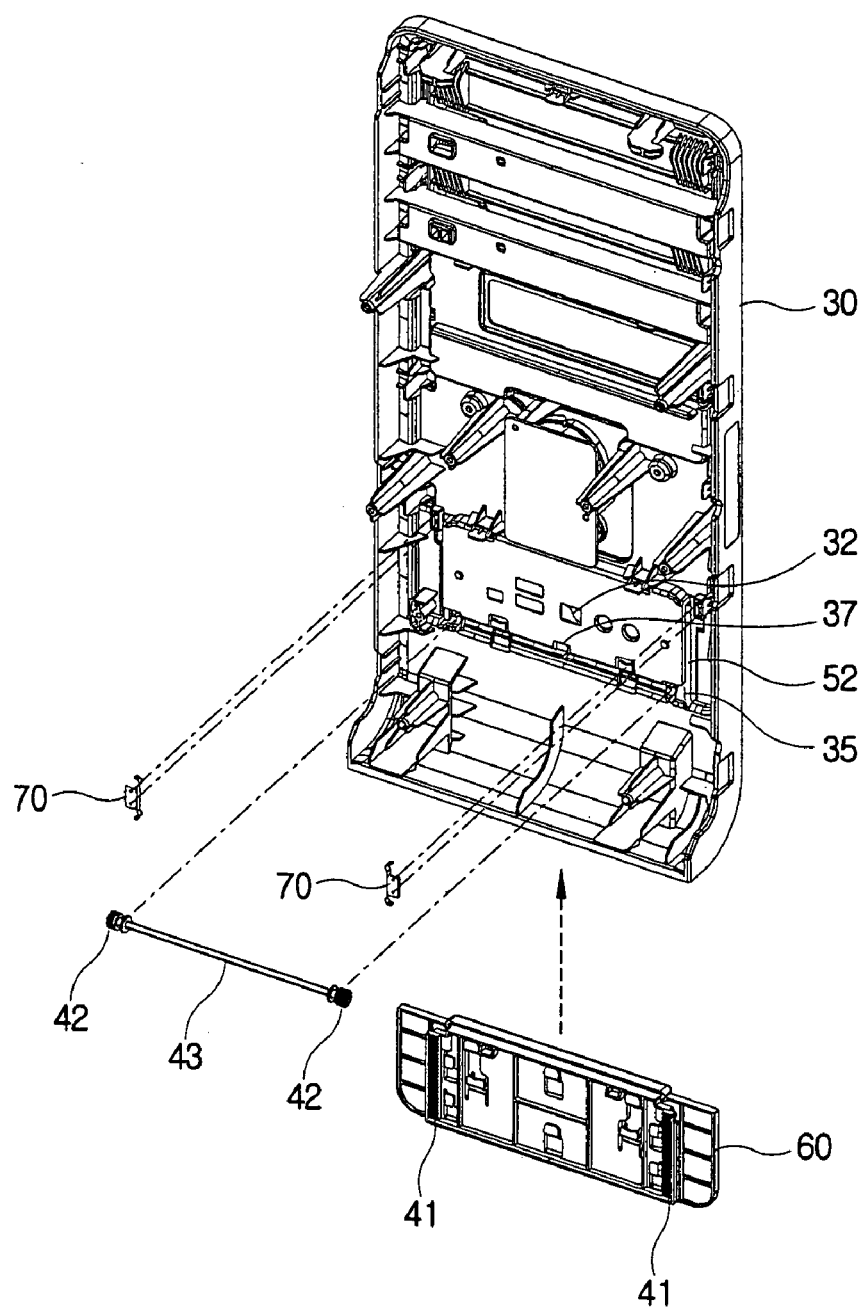
FIG. 3 is a rear exploded perspective view of the front casing of FIG. 2.

Reference will now be made in detail to the embodiments of the present invention, examples of which are illustrated in the accompanying drawings, wherein like reference numerals refer to the like elements throughout. The embodiments are described below to explain the present invention by referring to the figures.

As shown in FIGS. 1 through 5, a computer according to an embodiment of the present invention comprises: a computer main body 1, a monitor (not shown) to display a picture, and an inputter (not shown) including a mouse, and a keyboard and the like to input a predetermined signal.

The computer main body 1 comprises: a main body casing 10 forming an external appearance, a side casing 20 detachably connected with the main body casing 10 to open and close a side opening 11 positioned on a side of the main body casing 10, and a front casing 30 connected to a front of the main body casing 10.

The main body casing 10 is mounted with a main board (not shown), on which a central processing unit (CPU), a random access memory (RAM) and an extended card including a graphic card, a sound card and the like are installed. The main body casing 10 is also provided with a drive installing bay 12 on a front surface, adjacent to the front casing 30, to install external devices, including a floppy disc drive, a CD-ROM drive, and the like, therein.

The side casing 20 has a plurality of air through holes 21 to discharge heat generated by components installed in the main body casing 10 to the outside.

The front casing 30 has a plurality of through openings 31 on an upper part of the front casing 30, to expose end surfaces of the external devices to the outside. The through openings 31 are positioned corresponding to the drive installing bay 12, thereby communicating with the drive installing bay 12.

Under the through openings 31, there is a port part 33 having a plurality of ports 32 on the front surface of the front casing 30. The port part 33 is opened and closed with a cover 60 slidably connected to the front casing 30.

The cover 60 slides between an open position, at which the port part 33 is opened by a guide gear, and a closed position, at which the port part 33 is closed. Here, the sliding of the cover 60 is supported by an inserting part 53 of the cover 60, and a guide support having guide grooves 52 of the front casing 30, to accommodate the inserting part 53.

The port part 33 is recessed from the front surface of the front casing 30, and is provided with a plurality of ports 32 penetrating a surface of the port part 33, to insert connection pins installed in external devices such as a microphone, an earphone, or the like, therein.

On opposite sides of the port part 33, there is provided a pair of guides 51 to support opposite ends of a covering part 63 (to be described later). The guide grooves 52 are respectively positioned on the guides 51, to slidably accommodate the respective inserting parts 53 of the covering part 63 (to be described later) along a sliding direction of the cover 60. The guide grooves 52 are disposed on opposite side ends of the port part 33 facing each other.

Figure 11:
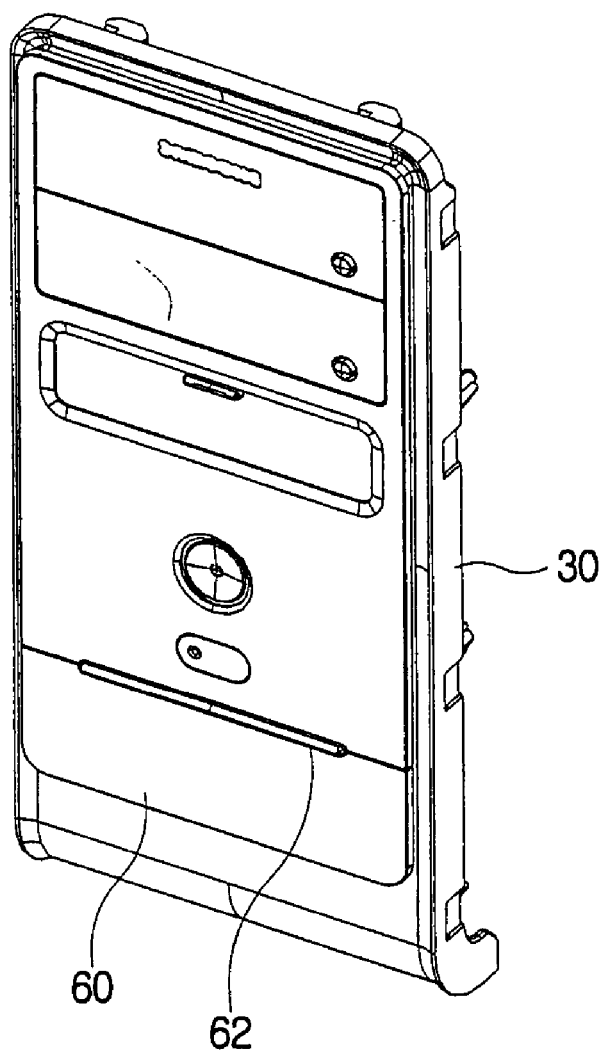
FIG. 11 is a front perspective view showing the computer of FIG. 1 when the cover closes the port part of the front casing of FIG. 9.

The cover 60 comprises: an exposed part 61 provided on an outside of the cover 60, that is exposed to the outside and has a length longer than that of the port part 33; and a covering part 63 provided on an inside of the cover 60 to cover the port part 33, that is positioned between the exposed part 61 and the port part 33 at the closed position, and has a length shorter than that of the exposed part 61. On an upper part of the exposed part 61, there is provided a handle 62 (see FIG. 11), to operate the cover 60.

The length of the covering part 63 is approximately the same as that of the port part 33. The covering part 63 comprises: the inserting parts 53, which are provided on opposite end parts of the covering part 63, each inserting part 53 is inserted in the corresponding guide groove 52 of the guide 51; racks 41 provided in the vicinity of each inserting part 53 and positioned along a direction of sliding; and locking grooves 54 recessed on upper parts of each inserting part 53 and provided in the vicinity of upper parts of the racks 41.

The locking grooves 54 are held by stoppers 70 provided on an inner surface of the front casing 30 and disposed on opposite sides with respect to the port part 33, so that the covering part 63 stays in the closed position. Here, the stoppers 70 are employed to prevent the cover 60 from being moved from the closed position to the open position by being locked in the locking grooves 54. Each stopper 70 comprises a fixed part 71 fixed on an inner surface of the front casing 30, and a pair of wings extended from opposite end parts of the fixed part 71 and having a predetermined elasticity. Only one of the wings, which extends from a lower part of the fixed part 71, is elastically locked in and released from the locking groove 54, thereby being employed as a locking holder 72 (see FIG. 7).

The guide gear comprises: the pair of racks 41 positioned on opposite sides of the inner side surface of the covering part 63; a pair of pinions 42, disposed on the front casing 30 with a predetermined interval therebetween, and respectively engaged with the racks 41; and a pinion shaft 43 to rotatably support the pair of pinions 42.

The pinions 42 each have a number of teeth corresponding to the racks 41 along a circumference, and are exposed to the port part 33 through a pair of pinion exposing openings 35 disposed on a lower part of the port part 33 with a predetermined interval therebetween. Each of the pinion exposing openings 35 communicates with one of the guide grooves 52 described above.

Each of the pinions 42 is rotatably supported on the front casing 30 by a pair of pinion supports 36 provided in the front casing 30 at a position corresponding to each of the pinion exposing opening 35.

The pinion shaft 43 is provided on a lower part of the port part 33 to rotatably support the pair of pinions 42, and is rotatably supported on the front casing 30 by a shaft support 37 provided on the inner surface of the front casing 30, and is positioned between the pair of pinion supports 36.

Thus, if a user holds the handle 62 and slides the cover 60 along a vertical direction to open and close the port part 33, the pair of pinions 42, exposed to the port part 33 through the pinion exposing opening 35, is engaged with the pair of racks 41 of the cover 60, so that sliding of the cover 60 is guided smoothly.

With a configuration described above, the computer is opened and closed as follows, as is shown in FIGS. 6 through 11.

Figure 4:
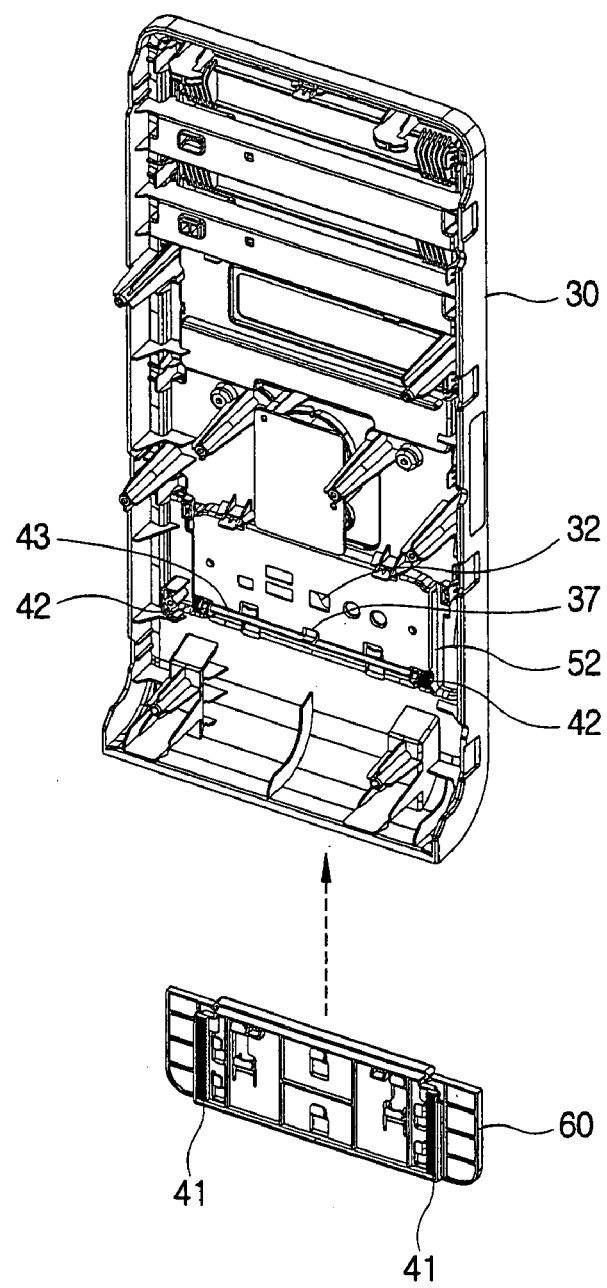
FIG. 4 is a rear perspective view of FIG. 2.
Figure 5:
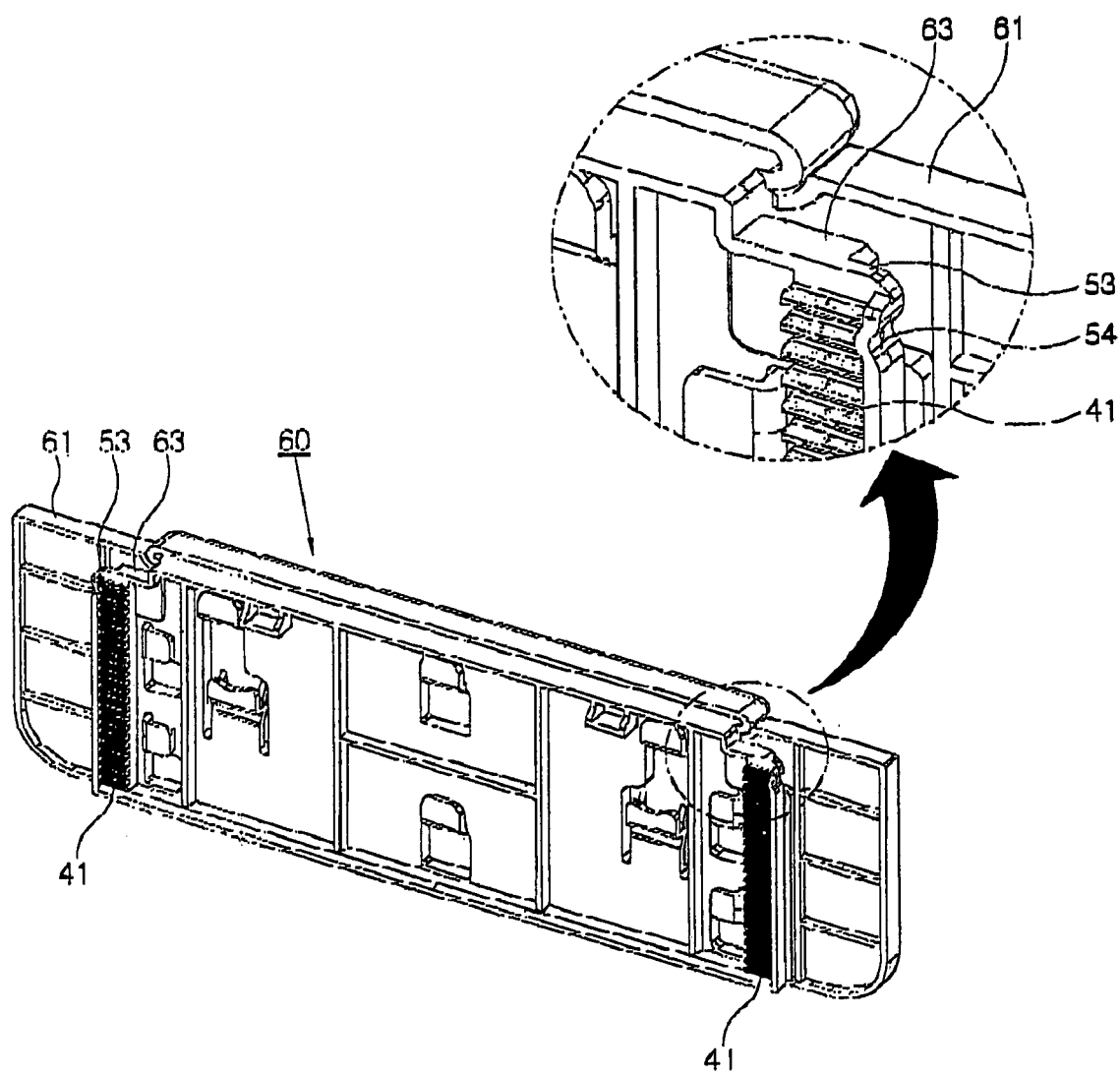
FIG. 5 is a rear perspective view of the cover of FIG. 2.

To assemble the front casing 30 and the cover 60, which are separated from each other, first, the upper parts of the inserting parts 53 of the cover 60 are partially inserted in the guide grooves 52 positioned in the guides 51, as is shown in FIG. 4. That is, the upper parts of the inserting parts 53, at which the locking grooves 54 are positioned, are inserted in the guide grooves 52. Here, the pair of racks 41 provided in the covering part 63 of the cover 60 is engaged with the pair of pinions 42 exposed to the lower part of the port part 33 through the pinion exposing openings 35.

Figure 6:
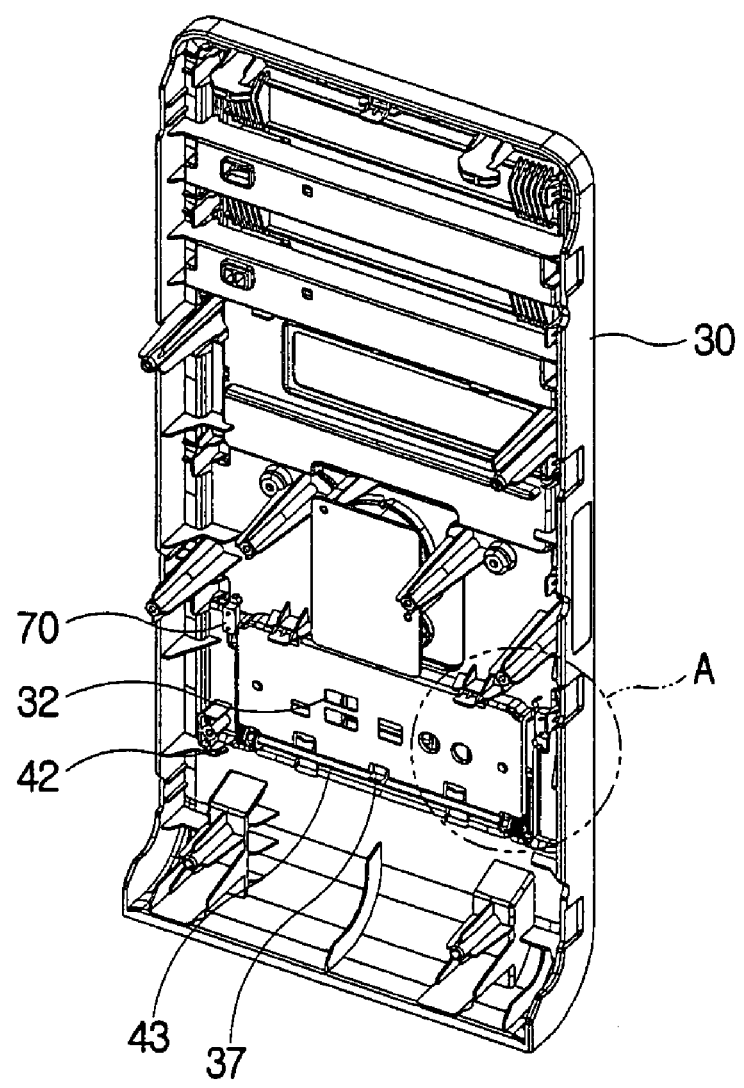
FIG. 6 is a rear perspective view showing the computer of FIG. 1 when the cover closes a part of the front casing.
Figure 7:
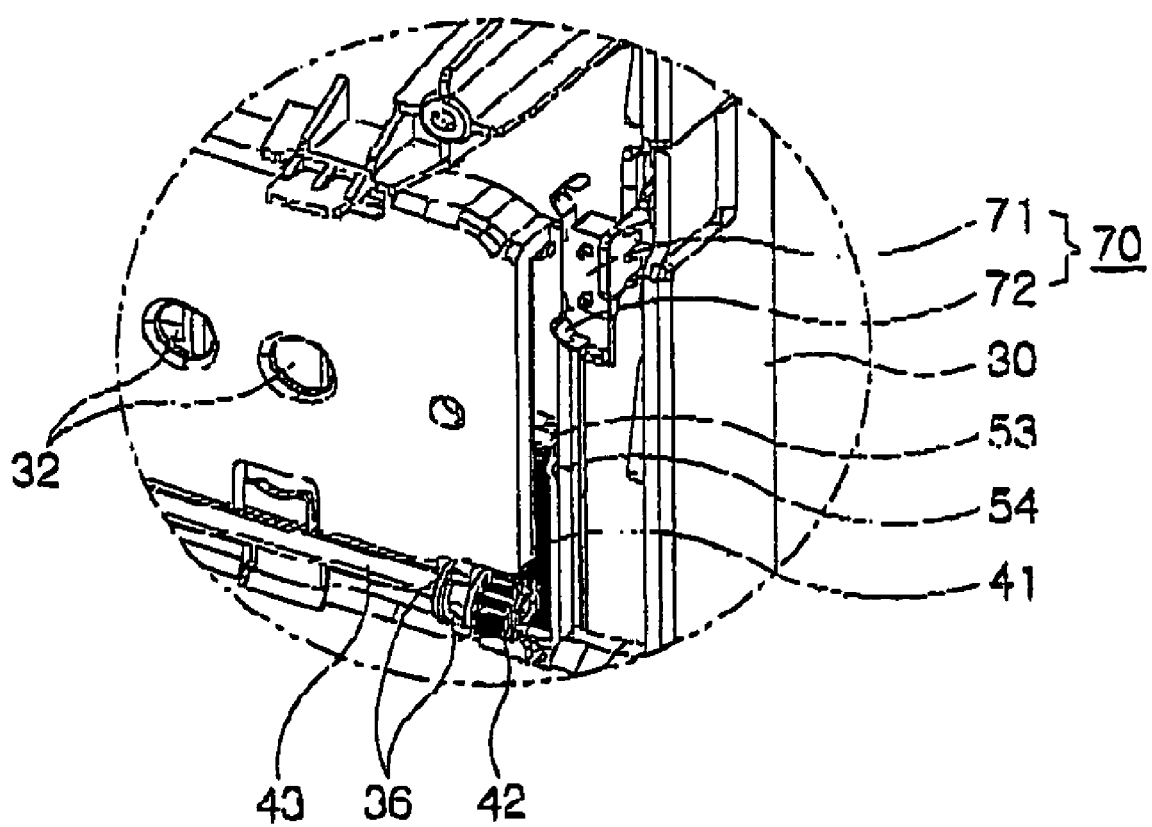
FIG. 7 is an enlarged view of the section A of FIG. 6.
Figure 8:
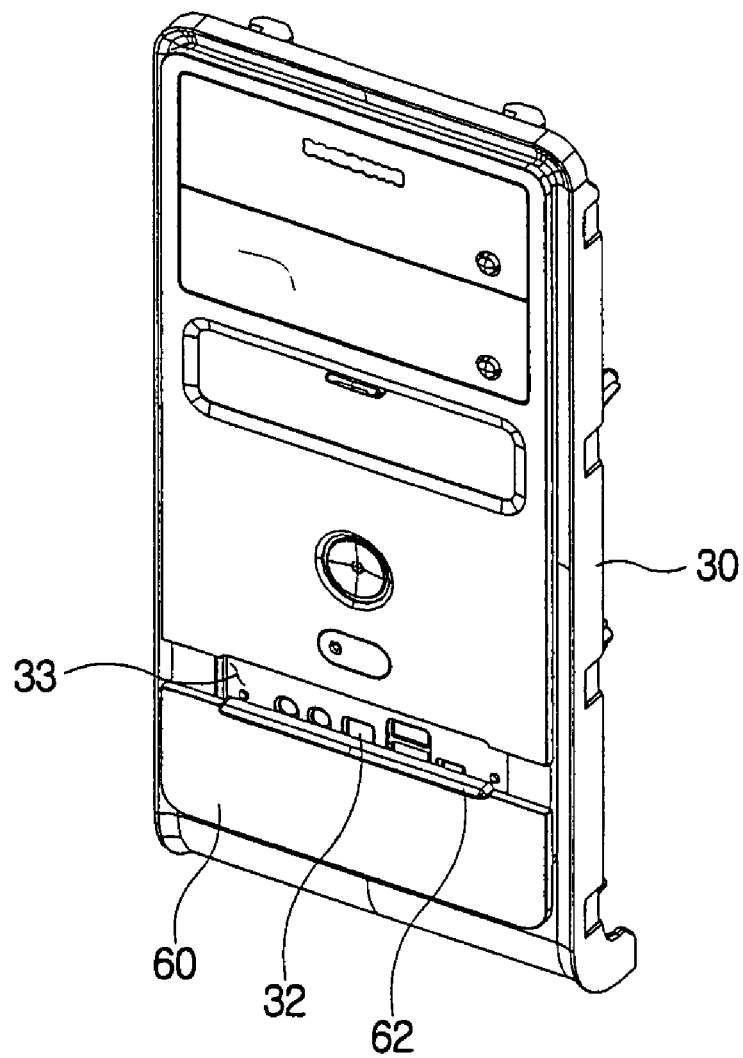
FIG. 8 is a front perspective view showing the computer when the cover closes a part of a port part of the front casing of FIG. 6.

Next, if the user holds the handle 62 and moves the cover 60 up in a predetermined distance, the cover 60 slides up smoothly, as the rack 41 of the cover 60 and the pinion 42 exposed to the port part 33 engage, so that sliding of the cover 60 is guided (refer to FIGS. 6 and 7). As is shown in FIG. 8, at this point, a part of the port part 33 is covered by the cover 60.

Figure 9:
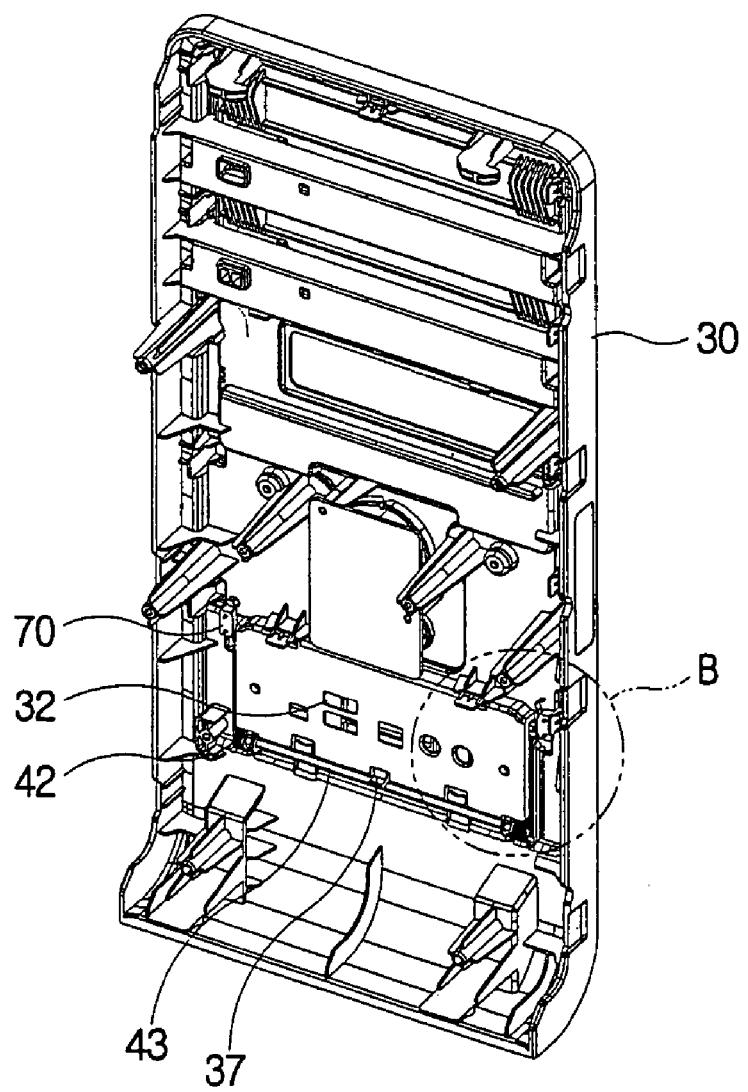
FIG. 9 is a rear perspective view showing the computer of FIG. 1 when the cover closes the whole port part of the front casing.
Figure 10:
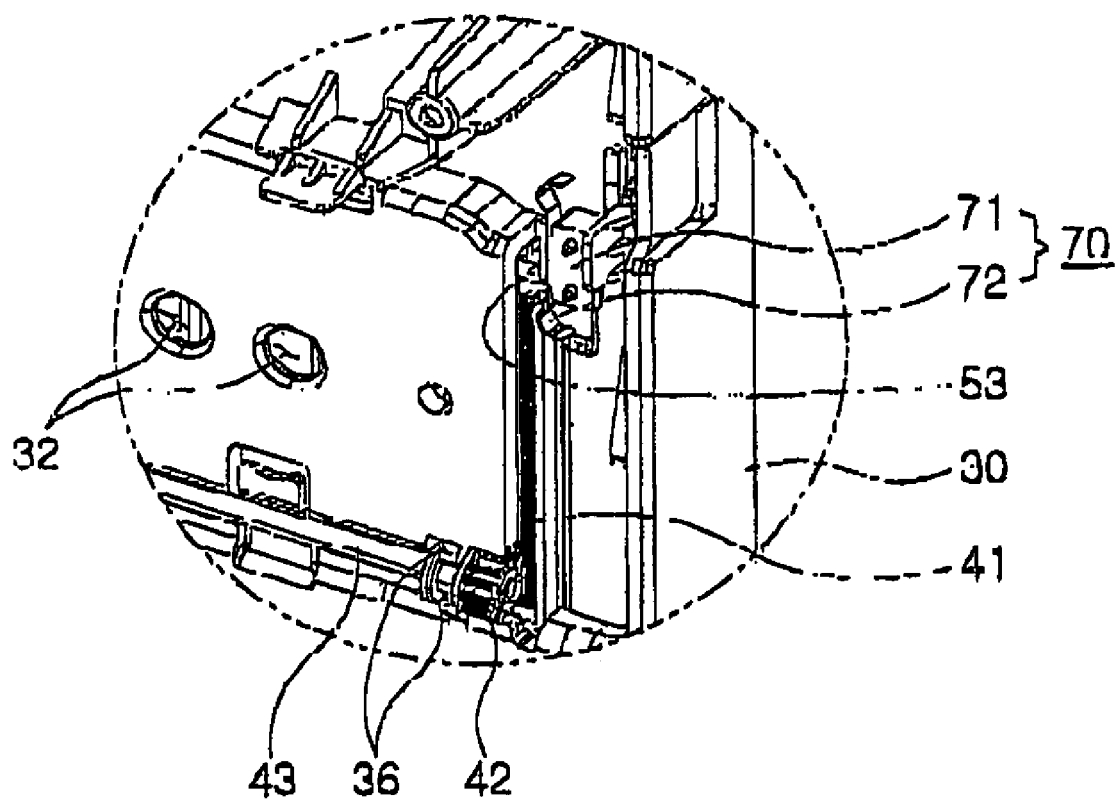
FIG. 10 is an enlarged view of the section B of FIG. 9.

If the user moves the handle 62 of the cover 60 higher, to close the port part 33 completely, the cover 60 continues to slide up smoothly, and arrives at the closed position (refer to FIG. 11), at which the cover closes the port part 33 completely. Then, as shown in FIGS. 9 and 10, the locking holders 72 of the stoppers 70 engage the respective locking grooves 54 positioned at the upper parts of the inserting parts 53 of the covering part 63, thereby preventing the cover 60 from moving down to the open position.

As is described above, the cover 60 slides using the guide gear, so that the cover 60 can open and close the front opening 34 of the port part 33. Thus, the user can operate the cover 60 to open and close the port part 33 easily, without the inconvenience of the conventional computer.

In the embodiment of the present invention, the cover 60 slides using the guide gear, so that the cover is not tilted rightward or leftward, if the user does not hold the handle 62 provided in a center of the cover 60, but rather holds a right or left part of the cover 60. Thus, the cover 60 to open and close the port part 33 slides very smoothly.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A computer, including a computer main body mounted with a plurality of hardware, the computer comprising:
   a port part provided on a part of the main body and having at least one port;
   a cover slidably connected to the computer main body to open and close the port part; and
   a guide gear, provided between the cover and the port part, to guide the cover to slide between an open position, at which the cover opens the port part, and a closed position, at which the cover closes the port part,
   wherein the guide gear comprises
      a pair of racks provided on a first surface of the cover along a sliding direction,
      a pair of pinions disposed in the main body, spaced apart from each other, to engage the pair of racks, respectively, and
      a pinion shaft to rotatably support the pair of pinions.

2. The computer according to claim 1, wherein the cover comprises:
   an exposed part provided on an outer portion of the cover, having a length longer than a length of the port part;
   a covering part provided on an inner portion of the first surface of the cover to cover the port part, positioned between the exposed part and the port part at the closed position, and having a length shorter than the length of the exposed part, and
   wherein the rack is provided in the covering part.

3. The computer according to claim 2, further comprising:
   a guide support to support sliding of the cover against the front casing, the guide support having:
      inserting parts respectively provided on opposite end parts of the covering part, and
      a pair of guide grooves, respectively positioned on opposite sides of the port part to slidably accommodate the inserting part.

4. The computer according to claim 3, wherein:
   the port part has a pair of pinion exposing openings, each communicating with one of the guide grooves, to expose the pinions to the port part.

5. The computer according to claim 4, wherein a first surface of the main body is provided with:
   a pair of pinion supports positioned corresponding to the pinion exposing openings, to rotatably support the pinions, respectively; and
   a shaft support positioned between the pair of pinion supports, to rotatably support the pinion shaft.

6. The computer according to claim 5, further comprising:
   a pair of stoppers disposed on opposite sides with respect to the port part on the first surface of the main body, to engage lockers respectively positioned in upper parts of each inserting part, to prevent the cover from being moved from the closed position to the open position.

7. The computer according to claim 6, wherein the stopper comprises:
   a fixed part fixed on the first surface of the main body; and
   a locking holder extended from the fixed part and having a predetermined elasticity, to engage the locker.

8. A computer, including a computer main body mounted with a plurality of hardware, the computer comprising:
   a port part provided on a part of the main body and having at least one port;
   a cover slidably connected to the computer main body to open and close the port part; and
   a guide gear, provided between the cover and the port part, to guide the cover to slide between an open position, at which the cover opens the port part, and a closed position, at which the cover closes the port part,
   wherein the computer main body comprises
      a main body casing forming an external appearance, and
      a front casing connected to a front of the main body casing,
   the port part is recessed from a front surface of the front casing, to provide a front opening, and
   the guide gear comprises
      a pair of racks provided on a first surface of the cover along a sliding direction,
      a pair of pinions disposed in the front casing, spaced apart from each other, to engage the pair of racks, respectively, and
      a pinion shaft to rotatably support the pair of pinions.

9. The computer according to claim 8, wherein the cover comprises:
   an exposed part provided on an outer portion of the cover, having a length longer than a length of the port part; and
   a covering part provided on an inner portion of the first surface of the cover to cover the port part, positioned between the exposed part and the port part at the closed position, and having a length shorter than the length of the exposed part,
   wherein the rack is provided in the covering part.

10. The computer according to claim 9, further comprising:
    a guide support to support sliding of the cover against the front casing, the guide support having:
       inserting parts respectively provided on opposite end parts of the covering part, and a pair of guide grooves, respectively positioned on opposite sides of the port part to slidably accommodate the inserting part.

11. The computer according to claim 10, wherein:
the port part has a pair of pinion exposing openings each communicating with one of the guide grooves, to expose the pinions to the port part.

12. The computer according to claim 11, wherein the first surface of the front casing is provided with:
a pair of pinion supports positioned corresponding to the pinion exposing openings, to rotatably support the pinions, respectively; and
a shaft support positioned between the pair of pinion supports, to rotatably support the pinion shaft.

13. The computer according to claim 12, further comprising:
a pair of stoppers disposed on opposite sides with respect to the port part on the first surface of the front casing, to engage lockers respectively positioned in upper parts of each inserting part, to prevent the cover from being moved from the closed position to the open position.

14. The computer according to claim 13, wherein the stopper comprises:
a fixed part fixed on the first surface of the front casing; and
a locking holder extended from the fixed part and having a predetermined elasticity, to engage the locker.

15. A front casing of a computer, comprising:
a port part to access a port on the computer;
a cover slidably connected to the front casing to selectively cover the port part;
at least one pinion rotatably connected to one of the port part and the cover; and
at least one rack, connected to the remaining one of the port part and the cover, and engaging the pinion to guide and move the cover to selectively cover the port part.

16. The front casing according to claim 15, wherein:
the at least one pinion forms a pair; and
the at least one rack forms a pair.

17. The front casing according to claim 15, wherein:
the one of the port part and the cover comprises an inserting part; and
the remaining one of the port part and the cover has a guide groove, to guide the inserting part when the cover is moved to selectively cover the port part.

18. The front casing according to claim 15, wherein:
the one of the port part and the cover comprises a stopper; and
the remaining one of the port part and the cover has a locking groove,
wherein the stopper elastically engages the locking groove when the cover covers the port part.

19. The front casing according to claim 16, further comprising:
a shaft support connected to the one of the port part and the cover
a pinion shaft connected to the pair of pinions, and rotatably connected to the shaft support.

20. The front casing according to claim 18, wherein the stopper comprises:
a fixed part connected to the one of the port part and the cover; and
a locking holder extending from the fixed part and elastically engaging the locking groove when the cover covers the port part.

21. The front casing according to claim 19, wherein:
the shaft support is connected to a first surface of the port part; and
the port part has a pair of pinion exposing openings exposing the pair of pinions, through the port part, to the pair of racks on the cover.

22. A front casing of a computer, comprising:
a port part to access a port on the computer;
a cover slidably covering and uncovering the port part
a pair of pinions rotatably connected to the port part; and
a pair of racks, connected to the cover, and respectively engaging the pair of pinions to guide and move the cover to selectively cover the port part.

23. A front casing of a computer, comprising:
a port part to access a port on the computer;
a cover slidably covering and uncovering the port part
a pair of pinions rotatably connected to one of the port part or the cover; and
a pair of racks, connected to the remaining one of the port part or the cover, and respectively engaging the pair of pinions to guide and move the cover to selectively cover the port part.

* * * * *